United States Patent [19]

Potter

[11] Patent Number: 6,015,326
[45] Date of Patent: Jan. 18, 2000

[54] FABRICATION PROCESS FOR ELECTRON FIELD-EMISSION DISPLAY

[75] Inventor: Michael D Potter, Scottsville, N.Y.

[73] Assignee: Advanced Vision Technologies, Inc., W. Henrietta, N.Y.

[21] Appl. No.: 08/900,915

[22] Filed: Jul. 28, 1997

Related U.S. Application Data

[60] Provisional application No. 60/025,550, Sep. 3, 1996, provisional application No. 60/025,555, Sep. 3, 1996, provisional application No. 60/025,556, Sep. 3, 1996, provisional application No. 60/032,197, Dec. 2, 1996, provisional application No. 60/032,199, Dec. 2, 1996, and provisional application No. 60/032,201, Dec. 2, 1996.

[51] Int. Cl.$^7$ ....................................................... H01J 9/14
[52] U.S. Cl. ................................................................ 445/52
[58] Field of Search ................ 445/52, 24; 252/301.4 R, 252/301.6 R; 427/157

[56] References Cited

U.S. PATENT DOCUMENTS

| | | | |
|---|---|---|---|
| 4,152,483 | 5/1979 | Kanda et al. | 428/403 |
| 4,275,333 | 6/1981 | Kagami et al. | 313/495 |
| 4,699,662 | 10/1987 | Nakada et al. | 106/287.13 |
| 5,077,088 | 12/1991 | Jeong | 427/218 |
| 5,120,619 | 6/1992 | Nakajima et al. | 428/690 |
| 5,138,171 | 8/1992 | Tecotzky et al. | 250/484.1 |
| 5,250,366 | 10/1993 | Nakajima et al. | 428/690 |
| 5,363,012 | 11/1994 | Mizukami et al. | 313/468 |
| 5,455,489 | 10/1995 | Bhargava | 315/169.4 |
| 5,478,499 | 12/1995 | Satoh et al. | 252/301.6 P |
| 5,507,976 | 4/1996 | Bringley et al. | 252/301.4 H |
| 5,536,383 | 7/1996 | Tran Van et al. | 204/490 |
| 5,549,843 | 8/1996 | Smith et al. | 252/301.4 H |
| 5,571,451 | 11/1996 | Srivastava et al. | 252/301.4 R |
| 5,601,751 | 2/1997 | Watkins et al. | 252/301.4 R |
| 5,618,216 | 4/1997 | Potter | 445/24 |
| 5,619,098 | 4/1997 | Toki et al. | 313/496 |

FOREIGN PATENT DOCUMENTS

| | | |
|---|---|---|
| 51151282 | 12/1976 | Japan. |
| 2047462 | 11/1980 | United Kingdom. |

OTHER PUBLICATIONS

H. W. Leverenz, "Phosphors Versus the Periodic System of the Elements" Proc. I.R.E. (May 1944) pp. 256–263.

H. W. Leverenz, "General Correlations between the Efficiency Characteristics and Constitutions of Phosphors" Proc. Opt. Soc. Am., v. 37 p. 520 (1947).

H. Kasper, "Die Koordinationsverhältnisse in Zinkniobat und –tantalst" Zeitschrift für anorganische and allgemeine Chemie, v. 355, No. 1–2 pp. 1–11 (Nov. 1967).

(List continued on next page.)

*Primary Examiner*—Kenneth J. Ramsey
*Assistant Examiner*—Michael S. Smith
*Attorney, Agent, or Firm*—Theodore R. Touw

[57] ABSTRACT

An electron field-emission display comprises one or more display cell structures, each having a field-emission cathode and an anode comprising at least one of several cathodoluminescent phosphors disclosed which are stimulable by electrons of very low energy. The display cell structures may also have gate elements for controlling electron current flowing from cathode to anode when suitable electrical bias voltages are applied. A preferred fabrication process integrates an etch stop with an in situ phosphor formation process. The etch stop precisely defines the depth of an opening in the display cell structure. Metal oxides or mixed-metal oxides of zinc, copper, tin, or indium are heated in the presence of a refractory metal such as titanium, zirconium, hafnium, vanadium, niobium, tantalum, chromium, molybdenum, tungsten, or combinations thereof to make phosphors of various chromaticities, which may also include dopants, such as a lanthanide rare earth element, manganese, chromium, or stoichiometrically excess zinc, copper, tin, or indium. A blue-light-emitting phosphor embodiment is based on ZnO treated with refractory metals, e.g. Ta, to prepare cathodoluminescent phosphor compositions, e.g. $Ta_2Zn_3O_8$. Selective arrangement of various color phosphors may be made by selective deposition of suitable dopants. The selective deposition may be done, e.g. by chemical vapor deposition with appropriate masking, or by selective ion implantation.

20 Claims, 8 Drawing Sheets

OTHER PUBLICATIONS

J. J. Brown et al., "Reactions between ZnO and Selected Oxides of Elements of Groups IV and V" Trans. British Ceramics Soc., v. 64 (1965), pp. 419–437.

M. H. Weichold et al. "Manufacturable vacuum field emission diodes" J. Vac. Sci. Technol. B, v. 11 No. 2 (Mar./Apr. 1993) pp. 505–510.

J. D. Legg et al. "Improved monolithic vacuum field emission diodes" J. Vac. Sci. Technol. B, v. 12 No. 2 (Mar./Apr. 1994) pp. 666–671.

R. T. Williams et al. "Blue light emission observed in a monolithic thin film edge emission vacuum microelectronic device" J. Vac. Sci. Technol. B, v. 13 No. 2 (Mar./Apr. 1995) pp. 500–504.

R. J. Langley et al. "A New Material for Thin Film Low Voltage Blue Phosphors" presented at 2nd International Conference on Science & Technology of Display Phosphors (San Diego, CA, No. 18–20, 1996).

S. K. Kurinec, et al. "Synthesis of Tantalum Zinc Oxide: A New Low Voltage Blue Phosphor" presented at Society for Information Display International Symposium SID '97 (Boston, Mass., May 13–15, 1997).

ISA/EPO, International Search Report for International Application No. PCT/US97/15374 (filed Aug. 30, 1997), report dated Jan. 14, 1998.

R. J. Langley et al. "Blue cathodoluminescence from tantalum zinc oxide" Proc. UGIM Symposium, Microelectronics Education for the Future, IEEE, New York, NY (1997) pp. 161–164.

FABRICATION PROCESS FOR ELECTRON FIELD-EMISSION DISPLAY

RELATED PATENT APPLICATIONS

This application is related to the following U.S. Provisional Patent Applications of Michael D. Potter: Ser. No. 60/025,550 titled "New Phosphor and Synthesis" filed Sep. 3, 1996; Ser. No. 60/025,555 titled "Integrated Etch Stop and Phosphor Process" filed Sep. 3, 1996; Ser. No. 60/025,556 titled "Integrated Etch Stop and Phosphor Process for Field Emission Device Display Applications" filed Sep. 3, 1996; Ser. No. 60/032,197 titled "Integrated Etch Stop and Low Voltage Phosphor Process for Field Emission Device Display Applications" filed Dec. 2, 1996; Ser. No. 60/032,199 titled "Integrated Etch Stop and Low Voltage Phosphor Process" filed Dec. 2, 1996; and Ser. No. 60/032,201 titled "New Low Voltage Phosphor and Synthesis" filed Dec. 2, 1996. This application is also related to three co-pending and commonly-owned U.S. Patent Applications of Michael D. Potter, viz., Ser. No. 08/901,701 "Process for Oxide Based Phosphors," Ser. No. 08/901,505 "Electron Field-Emission Display," and Ser. No. 08/901,403 "Oxide Based Phosphors and Processes Thereof," all filed on July 28, 1997.

FIELD OF THE INVENTION

This invention relates generally to phosphors and more particularly to new oxide-based phosphors particularly useful as cathodoluminescent phosphors excited by low-energy electrons, and processes for preparing the new phosphors, including processes for preparing the phosphors in situ while fabricating a display, such as an electron field emission device display (FED) or a vacuum fluorescent display (VFD).

BACKGROUND OF THE INVENTION

A phosphor emitting light in response to stimulation is useful in many technical fields, including fluorescent lights, electron field-emission device displays (FED), and vacuum fluorescent displays (VFD). A phosphor responsive to excitation by electrons of low energy (i.e. accelerated by a low voltage) is particularly useful, and there are particular needs for a blue-light-emitting phosphor of high spectral purity. The hue of light emission from a phosphor is often described in terms of a wavelength or range of wavelengths of emitted light, such as the wavelength of a major or dominant peak in the phosphor's emission spectrum, or by coordinates (x and y) in a CIE (Commission Internationale d'Eclairage) chromaticity diagram. Blue light is conventionally characterized in the wavelength sense by a spectrum with a dominant peak between about 380 nanometers and about 480 nanometers, e.g. around 430 nanometers (nm). Chromaticity x and y values in the region of the CIE 1931 chromaticity diagram corresponding to blue hues are in a region about x=0.15, y=0.1. Representative blue primaries in various standards for RGB display systems correspond to similar CIE 1931 chromaticity x and y values: for example, CIE spectrum primary blue x=0.167, y=0.009; NTSC standard primary blue x=0.140, y=0.080; and graphics-monitor primary blue x=0.150, y=0.070.

There is a long-standing and continuing need for phosphors emitting in the blue region of the spectrum with high spectral purity. Phosphors such as ZnO:Zn, ZnS:Au, $CdWO_4$, and $Zn_2WO_5$ (each having blue-green peak light emission) and $ZnGa_2O_4$, ZnS:Zn, and ZnS:Ag (each having generally blue peak light emission) have been known in the art for many years. (See, for example, the article by H. W. Leverenz, "Phosphors Versus the Periodic System of the Elements" Proc. I.R.E. [May 1944] pp. 256–263.) U.S. Pat. No. 4,275,333 to Kagami et al. describes fluorescent compositions and low-velocity-electron excited fluorescent display devices, utilizing phosphors which include blue-light-emitting phosphors. U.S. Pat. Nos. 5,120,619 and 5,250,366 to Nakajima et al. describe rare earth tantalate and/or niobate phosphors which emit light under X-ray excitation, with peak light emission generally below 370 nm, and typically between about 320 nm and 350 nm. U.S. Pat. No. 5,138,171 to Tecotzky et al. describes a photostimulable X-ray energy absorbing halosilicate, halogermanate, or halo(silicate-germanate) phosphor having prompt light emission with a peak wavelength around 445 nm. U.S. Pat. No. 5,478,499 to Satoh et al. describes a low-velocity electron excited phosphor of blue luminous color having CIE 1931 chromaticity diagram y values of 0.05 to 0.25. U.S. Pat. No. 5,507,976 to Bringley et al. describes stabilized phosphor intermediates and storage phosphors capable of storing latent X-ray images for later release. At least some of the storage phosphors taught by the Bringley et al. patent are the products of firing combinations ("stabilized intermediates") including oxides with oxosulfur reducing agent for molecular iodine. U.S. Pat. No. 5,549,843 to Smith et al. discloses annealed alkaline earth metal fluorohalide storage phosphors including metal oxides. U.S. Pat. No. 5,571,451 to Srivastiva et al. describes a quantum-splitting oxide phosphor doped with $Pr^{3+}$, which has an emission spectrum having a peak emission at 400 nm when excited by vacuum ultraviolet radiation.

Many phosphors have been developed with pigments incorporated into, attached, or coated on phosphors to modify the light emitted by the underlying phosphor in order to achieve a desired hue or a desired color temperature. For example, U.S. Pat. No. 4,152,483 describes a pigment coated phosphor and process for manufacturing it; U.S. Pat. No. 4,699,662 to Nakada et al. describes a blue pigmented phosphor; U.S. Pat. No. 5,077,088 to Jeong describes a process for preparation of a pigment-coated phosphor; and U.S. Pat. No. 5,363,012 describes a pigment-attached blue-emitting phosphor.

U.S. Pat. No. 5,455,489 to Bhargava describes displays comprising doped nanocrystal phosphors which comprise separated particles of a host compound activated by a dopant, the phosphor particles being of the order of 100 angstroms in size and exhibiting quantum-confined properties. Examples of such doped nanocrystal phosphors include $ZnS:Mn^{2+}$ (yellow) and $ZnS:Tb^{3+}$ (green), and II–VI host phosphors doped with Thulium (Tm), Terbium (Tb), and Europium (Eu) for blue, green, and red light emission respectively.

In an article by Roger T. Williams, Steven R. Evatt, James D. Legg, and Mark H. Weichold "Blue light emission observed in a monolithic thin film edge emission vacuum microelectronic device" Journal of Vacuum Science and Technology B, V. 13, No. 2 (March/April 1995), p. 500 ff., light emission at about 488 nanometers wavelength was reported from a multi-layer phosphor structure (Al, ZnO, and W) under forward bias conditions.

Many of the phosphors known in the art are conventionally prepared by methods including grinding the phosphor composition and/or its precursors to a powder having a particle size distribution suitable for a particular purpose. For example, phosphors prepared for X-ray storage panels may have a median particle size of about 0.5 to 40 micrometers. U.S. Pat. No. 5,536,383 to Tran Van et al. teaches the use of a non-aqueous suspension for the deposition of luminescent materials, particularly phosphors, by electrophoresis. Phosphor powder particles in the suspension have the finest possible grain size, e.g. approximately 1 to 10 micrometers. In a field-emission-excited cathodoluminescence display structure taught by Tran Van et al. the phosphor is deposited by electrophoresis onto a transparent, conductive coating, e.g. of indium and tin oxide (ITO), on a transparent insulating substrate. U.S. Pat. No. 5,601,751 to Watkins et al. discloses a manufacturing process for high-purity phosphors of small average particle size, exhibiting sufficient luminescent efficiency for utility in field emission displays. In the process of Watkins et al., a precursor mixture including a host lattice material and a dopant starting material is milled to obtain a sized precursor mixture having an average precursor particle size less than about 1 micrometer. Particle size growth during subsequent heating for infiltration of the dopant into the host lattice structure is held to a minimum, e.g. less than about 100% or preferably less than about 50%.

Phosphors intended to be used in vacuum fluorescent displays or display devices of the cold-cathode field-emission type should not contain substances that can contaminate the cathode, causing deterioration of electron emission. Thus phosphors containing sulfur (S), cadmium (Cd), or cesium (Cs), for example have not found favor for such applications, as those elements can cause contamination in the displays. U.S. Pat. No. 5,619,098 to Toki et al. discloses a phosphor free of S and Cd, made from compounds of titanium (Ti), alkaline earth metal, and an element of group 13 of the periodic table.

NOTATIONS AND NOMENCLATURE

The term "phosphor" is used throughout this specification and the appended claims in its conventional meaning, to mean a substance capable of luminescence when suitably excited by an energy source (e.g. electromagnetic waves, electrons, or an electric field). The electromagnetic radiation emitted may consist of photons having wavelengths in the visible spectral range. Stimuli suitable for stimulating the emissions of a phosphor include, but are not limited to: electron bombardment (stimulating cathodoluminescence), other incident photons (stimulating photoluminescence or fluorescence), specifically x-ray photons (stimulating x-ray luminescence), and electric fields (stimulating electroluminescence). The term "dopant" is used herein to mean a substance incorporated in a phosphor as an activator or luminescent center, either substitutionally or interstitially with respect to the crystal lattice of the host substance, or even adsorbed on a surface of the crystal lattice of the host substance. Such dopants are conventionally denoted by their chemical symbols appended to the chemical formula for the host substance after a colon, e.g. ZnO:Zn, a zinc oxide phosphor doped with excess zinc. The term "dopant" can also include co-activators used, for example, to facilitate charge transfer. "Annealing" as used herein means heating for an effective time and temperature for a particular purpose, e.g. to effect a chemical reaction, to allow a desired degree of diffusion, etc. The abbreviation "TZO" is sometimes used herein to represent $Ta_2Zn_3O_8$.

OBJECTS AND ADVANTAGES OF THE INVENTION

A major object of the invention is a phosphor which emits blue light of high spectral purity when suitably stimulated. More specific objects include phosphors having dominant wavelengths of emission of about 400 nanometers and having CIE 1931 chromaticity coordinates of about x=0.16 and about y=0.08 or having CIE 1976 chromaticity coordinates of about u'=0.18 and about v'=0.19. Another object is a blue-light-emitting phosphor which has a relatively narrow bandwidth of light emission. Other objects include phosphors which combine these properties with short persistence and high luminous efficiency. Yet another object is a blue-light-emitting phosphor that does not require addition of a pigment or a pigmented coating to achieve a desirable hue. A practical object is a phosphor that is useful in displays of several types and in blue or multi-color light sources. An important object is a cathodoluminescent phosphor stimulable by electrons of very low energy. Related objects include processes for preparing such a phosphor and processes for fabricating display devices utilizing such a phosphor. A more specific object is a process for preparing such a phosphor in situ while fabricating display devices. An even more specific object is a fabrication process in which synthesis of a phosphor is integrated with provision of an etch stop for forming an opening of a desired depth. Another specific object is a fabrication process for forming a thin region of blue-light-emitting phosphor at the surface of an anode in a display device operable using cathodoluminescence excited by electrons of very low energy. A related object is a blue-light-emitting phosphor that may be prepared as an electrically conductive composition. Yet another object is a new use for tantalum zinc oxide, $Ta_2Zn_3O_8$. Further objects include phosphors of various dominant wavelengths, prepared by methods similar to the methods disclosed for blue phosphors, and processes adapted for manufacturing such phosphors. In this respect, particular objects include red- and green-light-emitting phosphors compatible with processing of a blue-light-emitting phosphor, and the corresponding processes for making them. Other objects are processes for converting commercially available green-light-emitting phosphors to a blue-light-emitting phosphor. Particular further objects are displays (especially electron field-emission displays) comprising a number of cells formed with display devices, each display device including a phosphor having the desirable properties mentioned above, and processes for fabricating such displays.

SUMMARY OF THE INVENTION

Blue-light-emitting phosphors of this invention are based on metal oxides treated in various processes with refractory metals to prepare phosphor compositions having improved performance as cathodoluminescent phosphors stimulable by electrons of very low energy. In preferred embodiments, the phosphors are prepared in situ in an electrically-conductive thin-film or surface-layer form during fabrication of displays. Examples of the processes disclosed use metal oxides or mixed-metal oxides of zinc Zn, copper Cu, tin Sn, or indium In heated in the presence of a refractory metal such as titanium Ti, zirconium Zr, hafnium Hf, vanadium V, niobium Nb, tantalum Ta, chromium Cr, molybdenum Mo, tungsten W, or combinations or alloys or oxides thereof to make phosphors of various chromaticities. Phosphors made in accordance with the invention may also include dopants, such as manganese, chromium, a lanthanide rare earth element, or stoichiometrically excess zinc, copper, tin, or indium. A preferred process integrates an etch stop with the in situ phosphor process. The etch stop precisely defines the depth of an opening in a field-emission display cell structure utilizing the low-energy-electron excited blue-light-emitting phosphor.

The simplest process for making a phosphor in accordance with the invention is to add a quantity of tantalum pentoxide ($Ta_2O_5$) to a quantity of zinc oxide (ZnO) and to heat or "fire" the combination at an effective temperature and time to react at least a portion of each of the $Ta_2O_5$ and ZnO to form $Ta_2Zn_3O_8$, which can then be used in various forms as a blue-light-emitting phosphor. Processes for preparing phosphors in powder form, solid form for use as a sputtering target, and thin film forms are described in detail hereinbelow. Optionally, the dopants mentioned above may be used singly or in combination with each other or with other co-activators to modify the chromaticity of the phosphor in any of its powder, solid, or thin-film forms.

DETAILED DESCRIPTION OF THE PREFERRED EMBODIMENTS

In the following detailed description, reference is made to the several drawings, in which corresponding structural elements are denoted by the same reference numerals, and process steps are denoted by references such as S1, S2, . . . , etc. Numerical order relationships of process step references do not necessarily imply a time sequence in which steps must be performed. Thus step S1 of Example 1 described below, and step S20 of Example 4 described below are substantially equivalent, and each is the first step of the respective process example.

The phosphor of this invention, in its most preferred embodiment, is comprised essentially of zinc, tantalum, and oxygen. It is preferably made as a thin film phosphor, but alternatively may be made in a powder form or other forms. Other refractory metals, such as but not limited to Ti, Zr, Hf, V, Nb, Cr, Mo, W, or combinations or alloys thereof, can be used in place of or in addition to tantalum. It has been discovered unexpectedly that other metal oxides, such as tin oxide, indium-tin oxide, and copper oxide, may be used instead of zinc oxide in similar preparation techniques to produce additional new phosphors having generally similar desirable properties, and furthermore the dominant wavelengths of their light emissions may vary with composition. The phosphors made using tin oxide, indium-tin oxide, or copper oxide are not simply Sn-activated, In-activated, or Cu-activated phosphors, in which tin (or indium or indium-tin or copper) is an additive introduced in minor amounts as an activator of a host phosphor, but instead these phosphors contain substantial amounts of tin (or indium or indium-tin or copper). The phosphor material may also include dopants such as manganese and/or chromium and/or lanthanide elements and/or stoichiometrically excess zinc, tin, indium, or copper. In thin-film form, these new phosphors have not shown any evidence of charging at any voltage and therefore are especially suitable for low excitation voltages such as those needed for electron field emission device displays (FED) or vacuum fluorescent displays (VFD). Observations (with a dark-adapted, unaided human eye) of a phosphor made in accordance with the invention have shown an excitation threshold voltage of less than 10 volts with a current density of about 10 $\mu A/cm^2$. However, such a visual observation does not establish a physical limitation of the phosphor. Sensitive measurements using equipment such as photo-multiplier tubes may be used to determine a more accurate low excitation voltage threshold for a particular embodiment of the phosphor.

Figure 1:
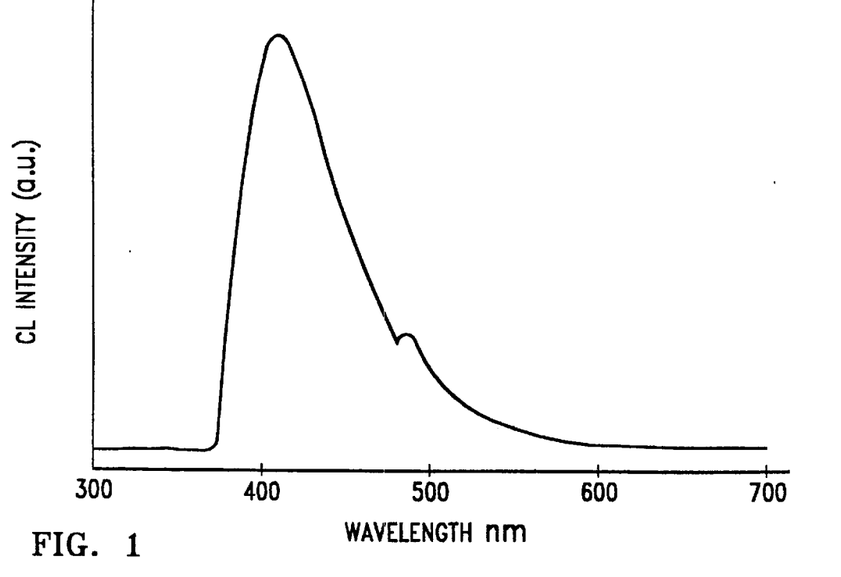
FIG. 1 is a graph of spectral emission measured from a phosphor made in accordance with a preferred embodiment of the invention.

The cathodoluminescent spectral response of the new phosphor preferred base material has a dominant peak near 400 nanometers, and a minor peak at somewhat longer wavelengths. FIG. 1 shows the shape of an emission peak measured for one embodiment of the phosphor. In FIG. 1, the peak cathodoluminescent emission occurs at a wavelength of about 400 nanometers. Effects of the various preparation processes and treatments are described in more detail hereinbelow.

Figure 2:
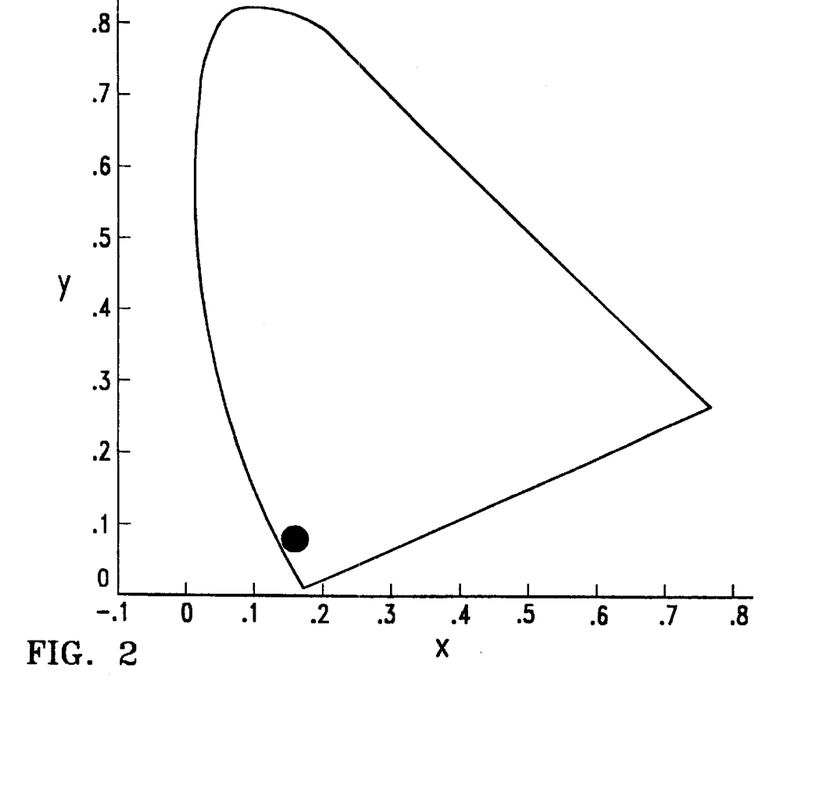
FIG. 2 is a CIE 1931 chromaticity diagram showing the chromaticity of cathodoluminescence from a blue-light-emitting phosphor made in accordance with a preferred embodiment of the invention.

FIG. 2 is a CIE 1931 chromaticity diagram showing the chromaticity of cathodoluminescence from a phosphor made in accordance with a preferred embodiment of the invention. This phosphor has CIE 1931 chromaticity coordinates of about x=0.16 and about y=0.08, equivalent to CIE 1976 chromaticity coordinates of about u'=0.18 and about v'=0.19.

The new phosphor material can be prepared in a number of ways. For example, starting materials can be separately deposited and subsequently annealed to form the new phosphor. The starting material may be precursors of the constituents. For example, instead of starting with zinc oxide, the starting material may be a compound capable of being converted to zinc oxide by heat treatment. Starting material deposition techniques include, but are not limited to: sequential sputtering, co-sputtering, sequential evaporation, co-evaporation, molecular beam epitaxy (MBE), ion-assisted epitaxy, atomic layer epitaxy, laser ablation deposition, chemical vapor deposition (CVD), metal-organic chemical vapor deposition, electron cyclotron resonance chemical vapor deposition, and plasma-enhanced chemical vapor deposition. The invention will be further clarified by considering the following examples, which are intended to be purely exemplary of the practice of the invention. A preferred method of preparing a preferred embodiment of the phosphors is described below as Example 1. Other alternative preparation methods are described as Examples 2, 3, and 4.

EXAMPLE 1

Referring now to FIGS. 3 and 7a–7k: a suitable substrate 20 is first provided (S1). On substrate 20, a layer of zinc oxide (ZnO) 30 is deposited (S2) by sputtering, such as rf sputtering. ZnO layer 30 may be about 0.5 micrometer thick. The ZnO may have an excess of zinc, which forms the "super-stoichiometric" zinc oxide phosphor (ZnO:Zn) known in the art. The zinc oxide material deposited in this manner tends to form columnar crystallites having a c-axis orientation (perpendicular to the substrate surface). It has been found by investigation of the new phosphor described herein that such an orientation greatly reduces thin film photon refractive trapping. This is a very useful result and is highly desirable for electronic display applications.

Figure 3:
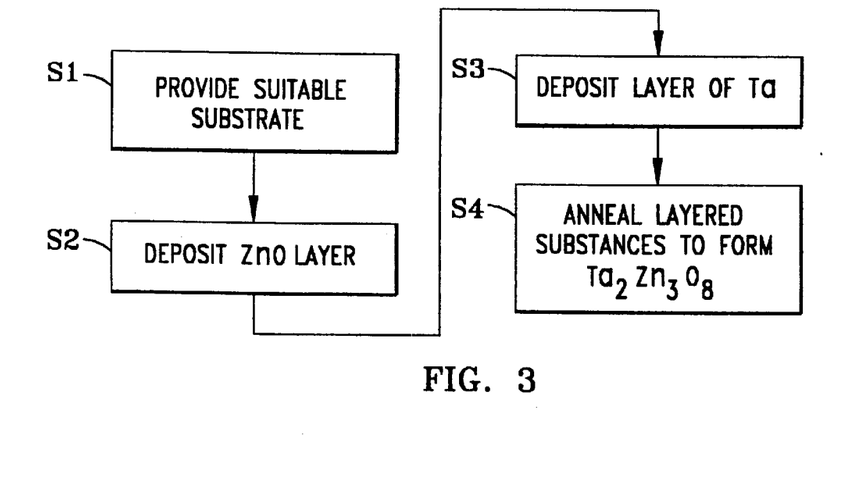
FIG. 3 is a flow chart illustrating a preferred process for preparing a preferred embodiment phosphor.
Figure 7A:
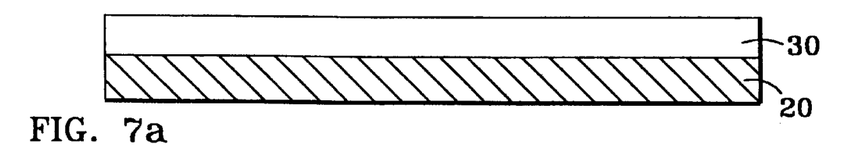
FIGS. 7a–7k are side elevation cross-sectional views of a display device structure made in accordance with the invention.
Figure 7B:
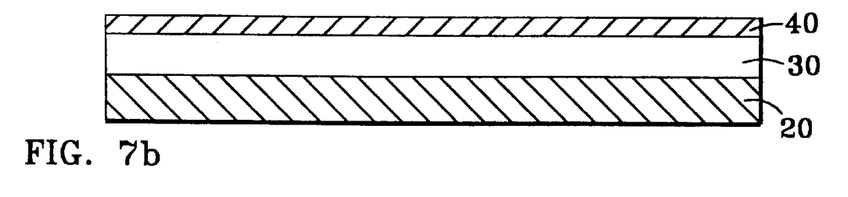

A tantalum layer 40 is deposited (S3) on top of the zinc oxide layer 30. The tantalum can be sputtered, for example. The thickness of the tantalum layer 40 is controlled to provide an effective amount of tantalum, based on the thickness of zinc oxide deposited in step S2. If too much tantalum is used, metallic Ta may remain unreacted or concentration quenching may occur. Suitable proportions of zinc oxide and tantalum may be achieved for many applications by controlling the tantalum layer thickness to be about 10 percent of the initial thickness of the zinc oxide layer. However, for low-voltage cathodoluminescent applications (i.e. those employing low-energy electrons), the tantalum layer thickness can be much less than 10 percent of the zinc oxide layer thickness, since the cathodoluminescence is a surface phenomenon. (The low voltage electron penetration and excitation takes place very near the phosphor surface—a few tens of nanometers for electrons below 500 V). Also the spectral output can include the normal spectral output of zinc oxide if the tantalum layer is kept thin enough so that the electrons excite cathodoluminescence in both the new phosphor and the underlying zinc oxide material. A tantalum thickness of 0.25 percent of the zinc oxide thickness (e.g. 2.5 nanometers of Ta for 1 micrometer ZnO) has been successfully used. Another especially useful arrangement had a film of Ta about 7.5–10 nanometers thick on about 200 nanometers of ZnO before annealing to form the phosphor in a very thin form.

An anneal (S4) of the layered materials is used to form the new phosphor material. A preferred way to anneal the zinc oxide/tantalum composite structure is to heat the composite at 1200° C. for two minutes in an inert environment, such as an atmosphere of nitrogen gas. This is commonly referred to as a "rapid thermal anneal" (RTA) or sometimes as a "rapid thermal process" (RTP). Wide ranges of effective temperatures and anneal times exist. Even a ten second anneal at 1200° C. is sufficient to substantially eliminate a green peak from the cathodoluminescence spectrum. A low temperature of 900 degrees centigrade and a high temperature of 1250° C. have been successfully used. The times used varied from 10 seconds to 6 minutes. However, these are not limitations. Other annealing techniques are also effective such as a standard thermal anneal in a furnace tube. By way of example, 1100° C. for 90 minutes has been an effective anneal. Laser annealing is another example of a suitable annealing process.

During the anneal, Ta combines with ZnO to some depth. In one sample using 1 micrometer thickness of ZnO and 30 nm of Ta and annealed at 1100° C. in an $Ar/O_2$ atmosphere, Auger electron spectroscopy profiling showed Ta present from the surface of the composite material to a depth of about ⅓ of the initial ZnO layer thickness, with a peak Ta concentration at about 150 nm below the surface. X-ray diffraction of such compositions indicate that they include both $Ta_2Zn_3O_8$ and ZnO. The $Ta_2Zn_3O_8$ is believed to be responsible for the blue luminescence observed. According to a scientific paper by Kasper "Die Koordinationsverhältnisse in Zinkniobat und -tantalat" in "Zeitschrift fur anorganische und allgemeine Chemie" Vol. 355, No. 1—1, pp. 1–11 (November 1967), another possible phase with lower molar ratios of $Ta_2O_5$ to ZnO is the phase $Ta_2ZnO_6$. This phase was not observed in the X-ray diffraction patterns mentioned above. It will be apparent to those skilled in the art that zinc oxide is an example of a preferred material and that other oxide materials (such as tin oxide, indium oxide, indium-tin oxide, or cupric oxide) can be used as suitable host bases. Similarly, those skilled in the art will readily understand that other refractory transition metals can be used to prepare other specific new phosphor materials similar to the composition described herein.

The phosphor described herein is preferably prepared as a thin film phosphor. However, it will be evident to those skilled in the art that other forms of the new phosphor can easily be made. For example, after the phosphor material is synthesized, it can be ground to a powder of a desired particle-size distribution, such as the powder phosphors commonly used in cathode ray tubes (CRT). The powdered form can be deposited onto a desired substrate by any of the known techniques, such as settling (sedimentation), spraying, or electrophoresis.

EXAMPLE 2

Figure 5:
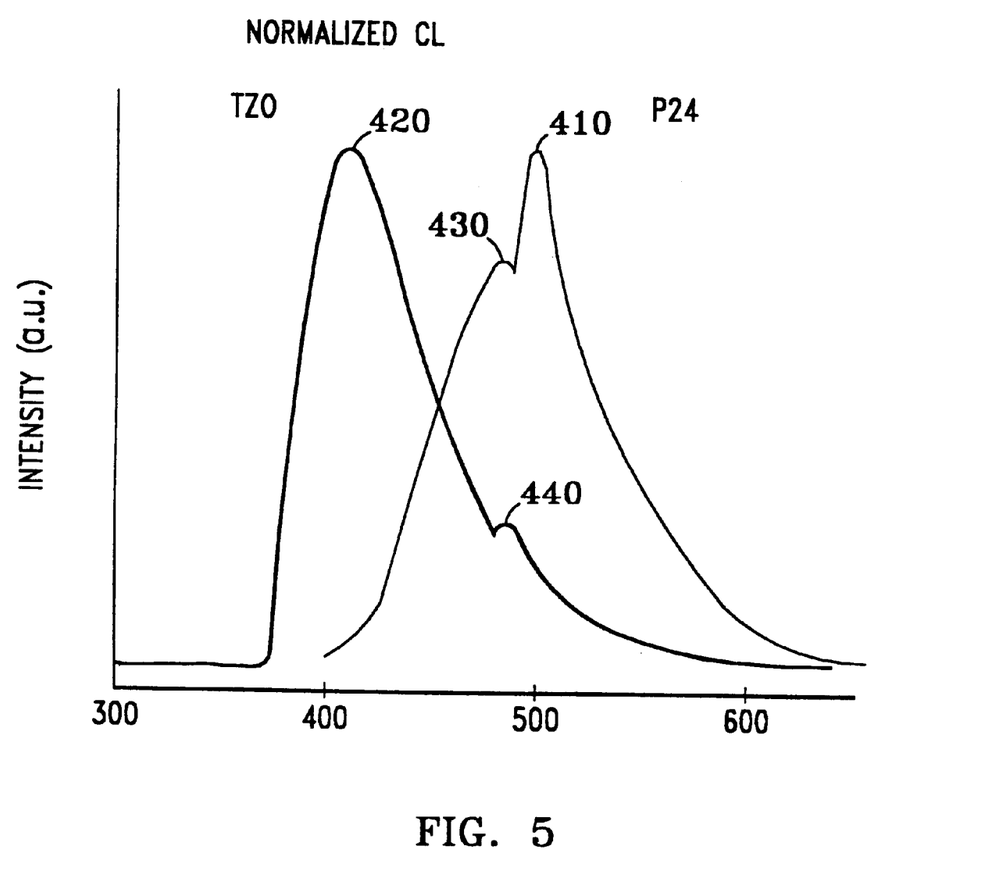
FIG. 5 is a graph of cathodoluminescent spectral emissions measured from a starting material phosphor and from a product phosphor made in accordance with the invention.

In this example, the starting materials are powders of commercially-available P24 phosphor (ZnO:Zn) and tantalum pentoxide ($Ta_2O_5$). Normalized cathodoluminescence spectra for the starting material and a phosphor product made in accordance with the present invention are shown in FIG. 5. The normal dominant cathodoluminescent emission peak 410 of P24 phosphor occurs at about 505 nm. These starting materials are mixed in suitable proportions (ignoring the excess Zn in the P24 phosphor) for the reaction:

$3ZnO+Ta_2O_5 \rightarrow Ta_2Zn_3O_8$.

The mixture is heated at an effective temperature (over about 900° C.), e.g. 1200° C. for a suitable time (e.g. 2 hours), resulting in a blue-light-emitting phosphor having a dominant peak 420 of cathodoluminescent emission at about 400 nm. A secondary (lower intensity) cathodoluminescent emission peak at about 493 nm is observed from both P24 (430) and in the $Ta_2Zn_3O_8$ phase (440).

EXAMPLE 3

Figure 4:
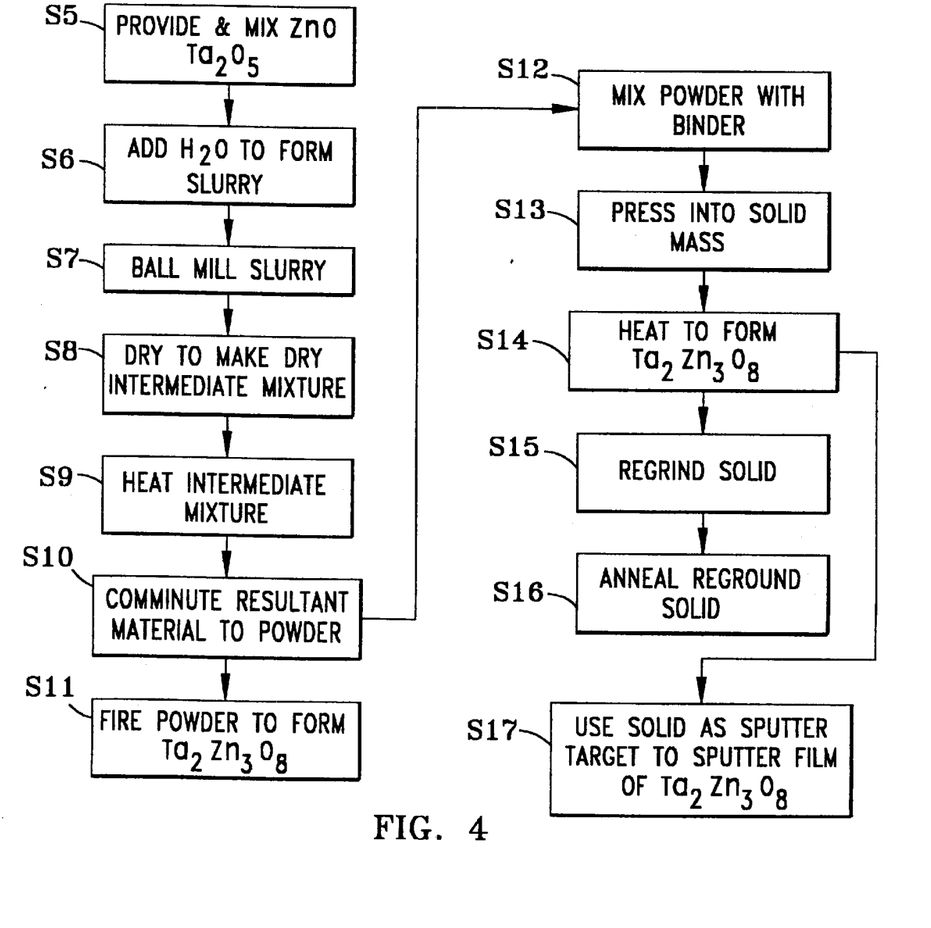
FIG. 4 is a flow chart illustrating processes for preparation of alternate forms of phosphors made in accordance with the invention.

In this example (illustrated by the flow chart of FIG. 4), the starting materials are ZnO and $Ta_2O_5$. The starting materials zinc oxide (ZnO) and tantalum pentoxide ($Ta_2O_5$) are mixed (S5) in proportions according to molecular weight for $Ta_2Zn_3O_8$ to form a mixture; water is added (S6) to the mixture to form a slurry; the slurry is ball milled (S7) and dried (S8) to provide a dry intermediate mixture; the dry intermediate mixture is heated (S9) at an effective temperature, equal to or greater than 900° C. in air or other ambient atmospheres; the resultant material is comminuted (S10) to a fine powder. The fine powder is either (1) fired (S11) at an effective temperature and time, e.g. 1200° C. or higher for about 1 hour or more, to form $Ta_2Zn_3O_8$, or (2) mixed (S12) with a binder such as polyvinyl alcohol, pressed into a solid (S13), and heated (S14) at about 1200° C. or higher for about 1 hour or more. The solid can be reground (S15) and annealed (S16) if required, or used (S17) as a sputter target, or simply used as a powder phosphor. When the solid is used as a sputter target as in step S17, the solid mass is disposed in suitable relationship to a phosphor-receiving surface, and material is sputtered from that solid sputtering target onto the phosphor-receiving surface to form a phosphor comprising $Ta_2Zn_3O_8$ on the phosphor-receiving surface. Other organic polymers, such as cellulose acetate butyrate, a polyalkyl methacrylate, a polyvinyl-n-butyral, a copoly-(vinyl acetate/vinyl chloride), a copoly-(acrylonitrile/butadiene/styrene), a copoly-(vinyl chloride/ vinyl acetate/vinyl alcohol), or a mixture of such organic polymers, may be used as the binder as alternatives to polyvinyl alcohol in step S12.

EXAMPLE 4

This example is an integrated fabrication technique using an etch stop that is also at the same time a component of an in situ phosphor-forming process. The etch stop material is used both to prepare the new low-voltage phosphor material and to define the depth of an opening in a display structure utilizing the phosphor. The etch stop solves the problem of over-etching that frequently occurs in the fabrication of field-emission displays. The etch stop first protects the nascent phosphor layer and subsequently is also used in preparation of the new phosphor. The etch stop layer does not need to be removed. After an anneal, at least a portion of the etch stop is incorporated into the base phosphor and modifies the composition of the base phosphor to produce the new phosphor, as described above in Example 1. Examples of applications of this integrated phosphor preparation process, performed in situ, include phosphor plates, screens, panels, and display matrices, among others.

The etch stop material is typically comprised of a refractory metal. However, other suitable materials can be used. Different materials can be used to modify the base phosphor selectively at different specific locations. This selective disposition of different substances can be used to make different spectral outputs at different locations. Dopants can be added to the etch stop material and, hence, are also incorporated into the base phosphor material to modify the spectral output. This may be also (or alternatively) done at specific locations by depositing the dopant(s) selectively. The selective disposition of dopants can be performed by ion implantation, for example.

Figure 6:
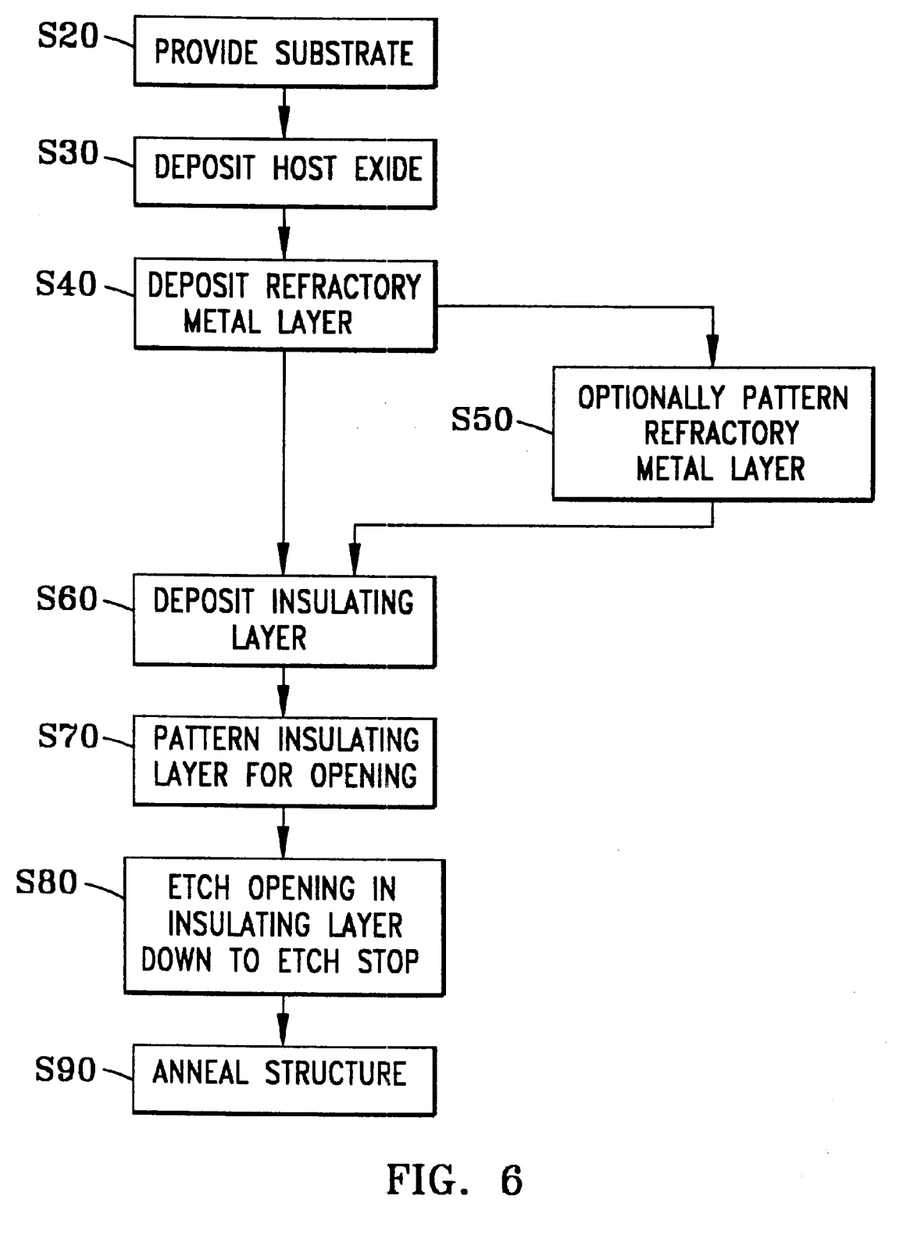
FIG. 6 is a flow chart illustrating a preferred process for in situ preparation of the phosphors.

The preferred fabrication method is described in detail below, with reference to FIG. 6, which is a flow chart illustrating the in situ process. Steps of the process are denoted by references S20, S30, . . . ,S90. A suitable substrate 20 is provided (S20). The substrate can be a conductive substrate, an insulating substrate, or an insulating substrate with patterned conductive portions, for example. In step S30, a host phosphor 30 such as zinc oxide is deposited on the substrate. A layer of a refractory metal 40 such as tantalum is then deposited (S40). If desired, the layer of refractory metal may be patterned (S50) by conventional patterning methods. A layer of insulator 50 is deposited (S60) over the refractory metal. The insulating layer is patterned (S70) to define an area for an opening 120. The insulator is etched (S80) to the etch stop provided by the refractory metal, to form an opening whose depth is precisely and automatically determined by the etch stop. In step S90, the entire structure is annealed to form the new phosphor material 35.

It will be understood by those skilled in the art that this preferred process description is an example only and does not limit the present invention to the particular materials, process conditions, or process sequence mentioned above. For example, there are numerous effective anneal conditions and many other refractory metals, such as, but not limited to, molybdenum, zirconium, titanium, and tungsten. There are also many dopants that can be used to dope the new phosphor, such as, but not limited to, manganese and/or chromium and/or lanthanides. Furthermore, there are many different types of substrates that can be used depending on the application. These include, but are not limited to, conductors, semi-conductors, insulators, and mixtures or composites thereof Some suitable substrates are silicon, silicon oxide, silicon nitride, metallized silicon oxide, and glass.

The process just described may be usefully included and integrated as a subprocess in an overall process for fabrication of electron field-emission-device displays (FED). This method discloses an etch stop which may be used in a trench etch process such as the etch process of U.S. Pat. No. 5,618,216 to Potter, the entire disclosure of which is incorporated herein by reference. The etch stop material is also used to create the new low-voltage phosphor material of the present application. The etch stop solves the problem of over etching during the opening or trench formation process. It first protects the phosphor layer, and it subsequently participates in formation of the new phosphor. The etch stop layer does not need to be removed. After an anneal, it is incorporated into the phosphor layer and modifies the initial phosphor layer's luminescence, particularly the chromaticity of its cathodoluminescence.

The etch stop material is typically comprised of a refractory metal. However, other suitable materials can be used. Different materials can be used selectively to modify the base phosphor layer at specific locations or pixel sites in order to fabricate a display emitting light of more than one color, e.g. different colors for different pixels. Alternatively, dopants can be added to the etch stop material and, hence, also incorporated into the base phosphor layer material to modify the spectral output. This may be done selectively at specific selected locations for creating different color pixels, e.g. by ion implantation after annealing, followed by a re-anneal if necessary to incorporate the dopant.

Figure 7C:
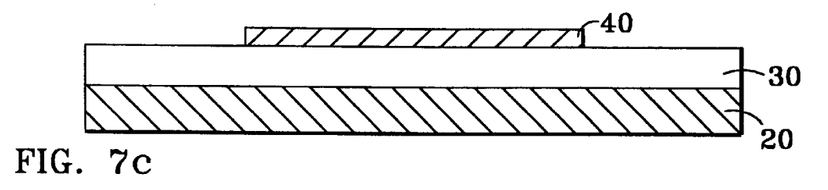
Figure 7D:
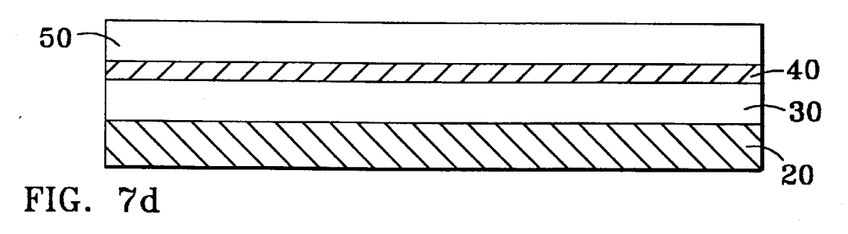
Figure 7E:
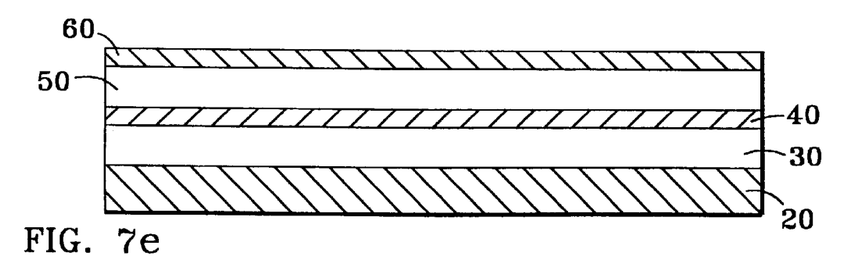
Figure 7F:
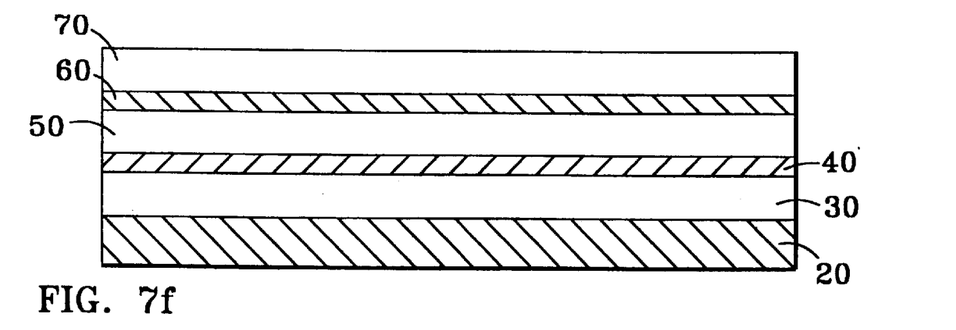
Figure 7G:
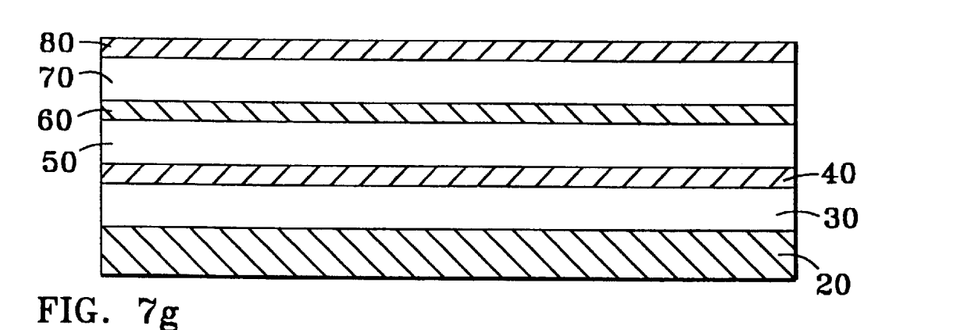
Figure 7H:
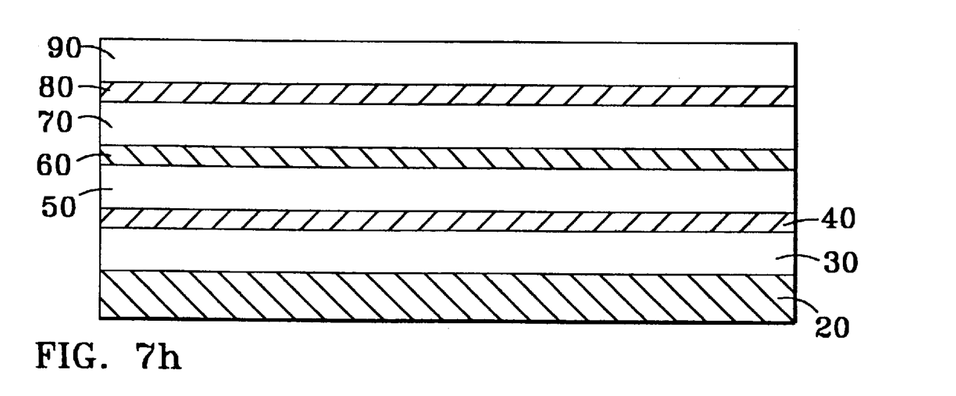
Figure 7I:
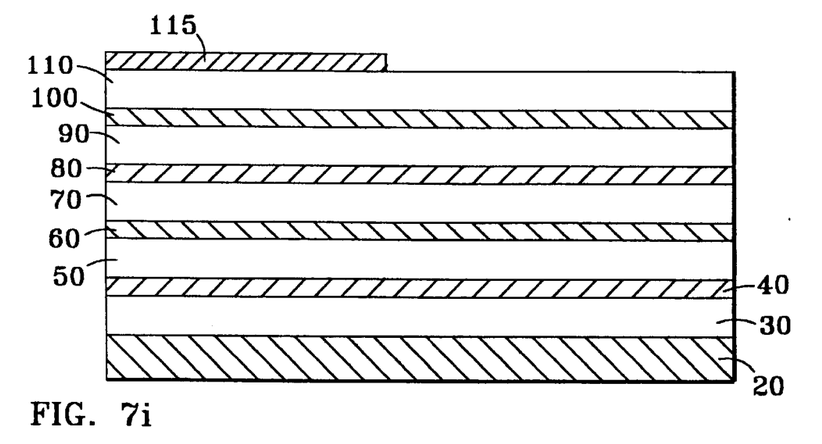
Figure 7J:
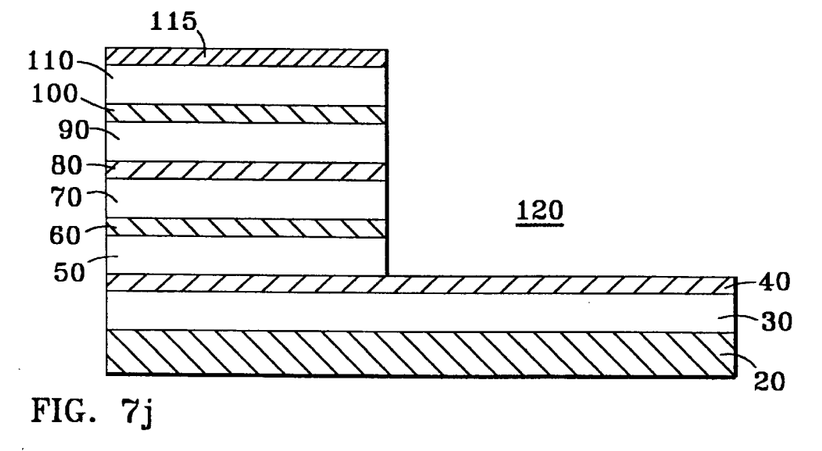
Figure 7K:
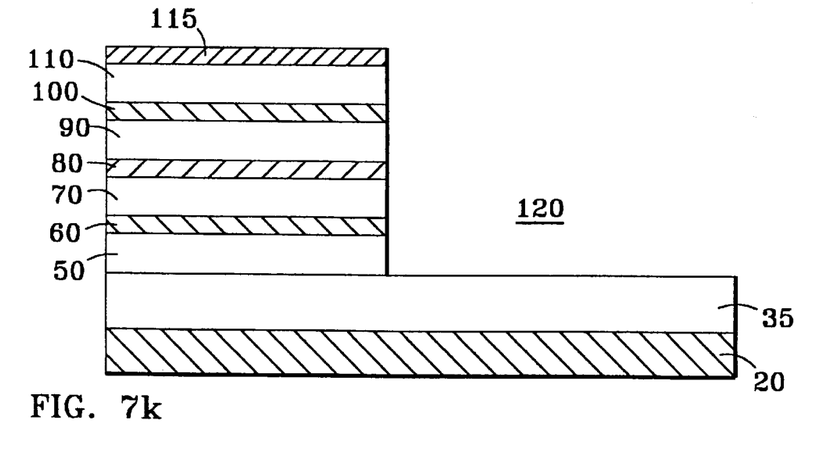
Figure 8:
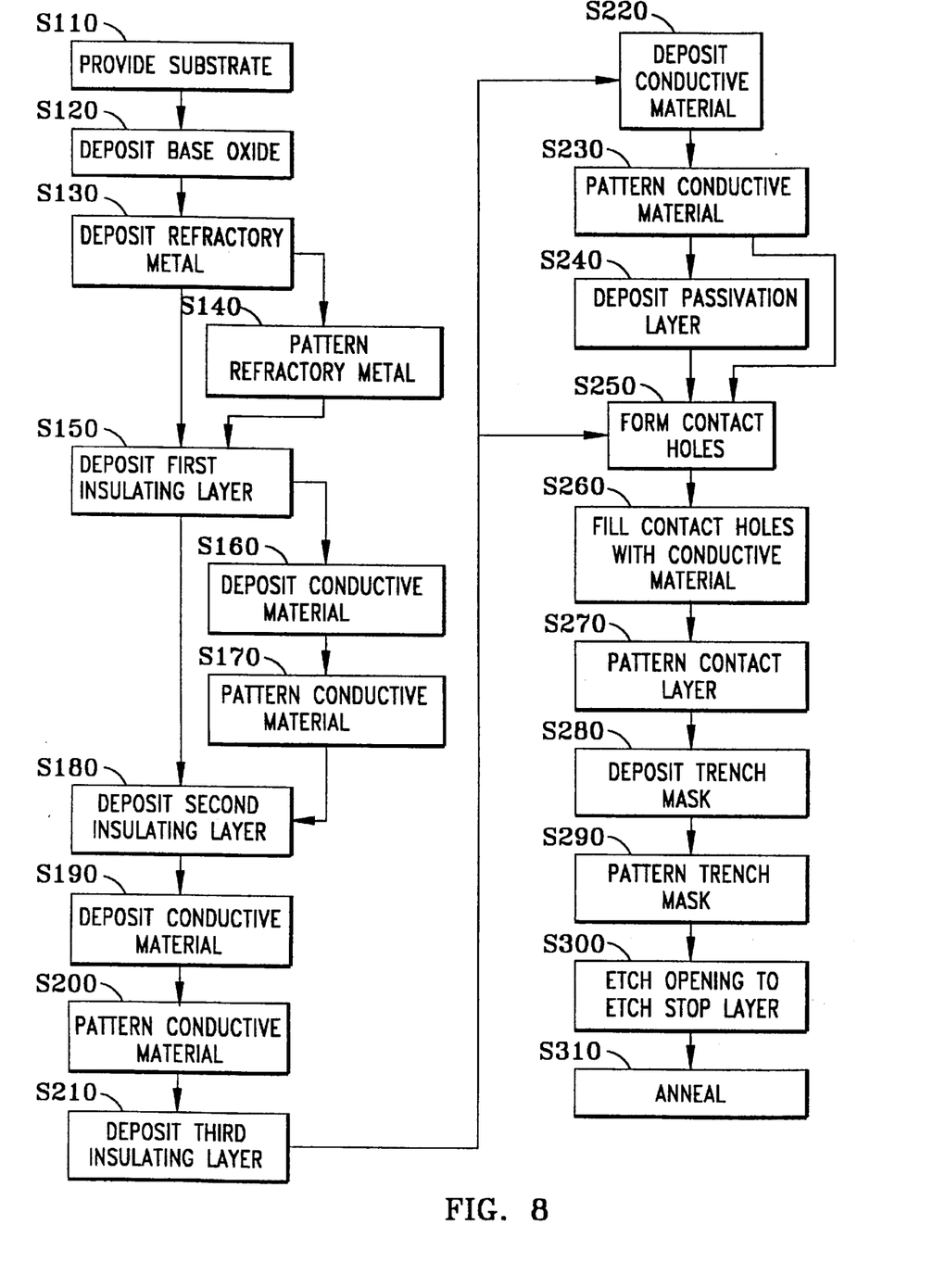
FIG. 8 is a flow chart illustrating a preferred process for fabricating the structure of FIG. 7k.

The preferred overall process for fabrication of electron field-emission-device displays is described in the following paragraphs, with reference to FIGS. 7a–7k and the flow chart of FIG. 8. The side elevation cross-section views of FIGS. 7a–7k are not drawn to scale. Steps of the process are denoted by references S110, S120, etc. For clarity, different step numbers are used within each process described in this specification, but the person of ordinary skill will recognize that several steps having different reference designations are equivalent. For example, the first step of the process to be described below is step S110, providing a suitable substrate, which is equivalent to steps S1 and S20 described above. For the present example the substrate 20 may be a flat conductive substrate. Once a suitable substrate 20 is provided (S110), a host (base) oxide 30 such as zinc oxide, tin oxide, indium oxide, indium-tin oxide, or cupric oxide is deposited (S120, FIG. 7a). A layer 40 of a refractory transition metal such as tantalum is deposited (S130) over the host (base) phosphor, FIG. 7b. If desired, the refractory metal layer 40 may be patterned (S140) as shown in FIG. 7c. A first insulating layer 50 is deposited (S150, FIG. 7d). If a lower gate element is desired, a conductive material 60 for a lower gate is deposited (S160, FIG. 7e) and patterned (S170, not shown in FIGS. 7a–7k). A second insulating layer 70 is deposited (S180, FIG. 7f). A thin film conductive emitter material 80 is deposited (S190, FIG. 7g) and patterned (S200). (Patterning that would be visible in a plan view is not shown in the cross-section views.) A third insulator 90 is deposited (S210, FIG. 7h). If an upper gate element is desired, a conductive material 100 for an upper gate is deposited (S220, FIG. 7i) and patterned (S230) (not shown in FIGS. 7a–7k). If a passivation layer is desired, a fourth insulating layer 110 is deposited (S240, FIG. 7i). Separate contact holes, spaced apart from each other, are formed (S250) from the upper surface to conductive layers such as the emitter layer and any gate layers, and conductive contact material is deposited (S260), filling the contact holes and forming a contact layer. The contact layer is patterned (S270) to provide contact patterns suitable to each type of contact (emitter, gate, etc.). The provision of contacts (S250–S270) is done in a conventional manner and is not shown in FIGS. 7a–7k. A trench mask 115 is deposited (S280) and patterned (S290), as shown in FIG. 7i. A trench opening 120 is etched (S300, FIG. 7j), which will stop on the etch stop provided by the refractory metal 40 deposited in step S130. Only the left side of opening 120 is shown in FIGS. 7j–7k; the right side is the same. The structure formed is annealed (S310, FIG. 7k), for example in a rapid thermal anneal in a nitrogen atmosphere for 10 seconds at 1200° C., to form phosphor layer 35 from base oxide layer 30 and refractory metal etch stop layer 40. It will be understood by those skilled in the art that the foregoing preferred process description is by way of example only and does not limit the invention to the particular materials, process conditions, or process sequence mentioned. A particular useful variation is to form the phosphor 35 in situ by annealing or heating (S310) before etching (S300) the opening 120, so that the phosphor itself serves as the etch stop that defines the depth of the opening 120. Instead of the elemental refractory metal, refractory metal layer 40 may be a substance containing the refractory metal, such as an oxide of a refractory metal, e.g., tantalum pentoxide instead of tantalum metal.

Dopant substances may be added in various ways before heating the other components, e.g. during preparation of a powder phosphor by mixing a quantity of dopant with the other starting materials, or co-deposited with the base oxide or the refractory metal during the thin-film processes, for example. Examples of suitable dopants are manganese or terbium for providing a green peak in the spectral output or europium for providing a red peak in the spectral output. While amounts of dopants up to about 10 atomic percent may be used, preferred amounts are 5 atomic percent or less. For low-electron-energy cathodoluminescence applications, any dopant used may be incorporated in only a thin surface layer on otherwise un-doped phosphor, as long as the doped surface region thickness exceeds the small penetration depth of such low-energy electrons.

Thus one aspect of the invention is a phosphor comprising, in atomic percentages, 90% to 100% of a mixed metal oxide $M_xT_yO_z$, wherein M is a metal selected from Zn, Sn, In, Cu, and combinations thereof, T is a refractory metal selected from Ti, Zr, Hf, V, Nb, Ta, Cr, Mo, W, and combinations thereof, and O is Oxygen, x, y, and z being chosen such that z is at most stoichiometric for $M_xT_yO_z$; and also comprising 0% to 10% of a dopant comprising a substance selected from a rare earth element of the lanthanide series, Mn, Cr, and combinations thereof. Other aspects of the invention include methods for making such phosphors in thin-film form, in powder form, and in the form of a solid mass for use as a sputtering target. Another aspect of the invention is a particular method for forming such phosphors in situ on a substrate. A particular aspect of that method is an integrated etch-stop and phosphor-forming process, which is specially adapted for fabricating a field-emission display cell structure. Such field-emission display cell structures have a field-emission cathode and an anode comprising at least one of the phosphors of the present invention. They may also have one or more gate elements for controlling the electron current that flows from the cathode to the anode of the field emission devices when suitable electrical bias voltages are applied. They may have more than one phosphor, and in particular may have red, green, and blue phosphors selectively arranged. For example, each pixel site may have one anode of each color phosphor. The selective arrangement of various color phosphors is done, in preferred embodiments, by selective deposition of suitable dopants. That dopant deposition may be done with appropriate masking and chemical vapor deposition, or by selective ion implantation, for example. Yet another aspect of the invention is a display composed of one or more such field-emission display cell structures, each cell being formed by the processes described hereinabove.

From the foregoing description, one skilled in the art can easily ascertain the essential characteristics of this invention, and without departing from the spirit and scope thereof, can make various changes and modifications of the invention to adapt it to various usages and conditions. Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, numerous effective anneal conditions may be used, and many refractory transition metals are available, such as tantalum, chromium, molybdenum, vanadium, niobium, zirconium, tungsten, hafnium, or titanium. There are many dopants that can be used to dope the new phosphors, such as manganese, chromium, and the rare earth elements of the lanthanide series. In one variation of the sequence for instance, the base phosphor oxide can be deposited (step S120) after the trench-forming step S300. Uses of the phosphors and associated processes and/or structures can include many diverse applications, such as gamma-ray pinhole photography, for example. Accordingly, the scope of the invention should be determined not by the embodiments illustrated, but by the appended claims and their equivalents.

Having described my invention, I claim:

1. An integrated etch stop and phosphor-forming fabrication process comprising the steps of:

a) depositing a base layer of a first phosphor, b) depositing a refractory metal etch stop layer, and c) annealing to combine at least a portion of said base layer with at least a portion of said refractory metal etch stop layer to form a second phosphor.

2. An integrated etch stop and phosphor-forming fabrication process as in claim 1, wherein said base layer depositing step (a) is performed by depositing a metal oxide selected from zinc oxide (ZnO), stannic oxide (SnO), cupric oxide (CuO), and indium-tin oxide (ITO).

3. An integrated etch stop and phosphor-forming fabrication process as in claim 1, wherein said base layer depositing step (a) is performed by depositing zinc-doped zinc oxide (ZnO:Zn).

4. An integrated etch stop and phosphor-forming fabrication process as in claim 1, wherein said annealing step (c) is performed using effective temperature and time to form a chemical compound including:

i) zinc, ii) a refractory metal, and iii) oxygen.

5. An integrated etch stop and phosphor-forming fabrication process as in claim 1, wherein said refractory metal etch stop layer depositing step (b) is performed by selectively depositing refractory metal only in predefined areas.

6. An integrated etch stop and phosphor-forming fabrication process as in claim 1, further comprising the step of patterning said refractory metal etch stop layer.

7. An integrated etch stop and phosphor-forming fabrication process as in claim 1, wherein said refractory metal etch stop layer depositing step (b) is performed by depositing a refractory metal selected from the list consisting of titanium, zirconium, hafnium, vanadium, niobium, tantalum, chromium, molybdenum, tungsten, combinations thereof, and alloys thereof.

8. An integrated etch stop and phosphor-forming fabrication process as in claim 1, wherein said refractory metal etch stop layer depositing step (b) is performed by depositing tantalum.

9. An integrated etch stop and phosphor-forming fabrication process as in claim 1, wherein at least one of said base layer depositing step (a) or said refractory metal etch stop layer depositing step (b) includes depositing a dopant material for doping said second phosphor.

10. An integrated etch stop and phosphor-forming fabrication process as in claim 1, further comprising the steps of:
   d) disposing an insulating layer over said etch stop layer, and
   e) etching through at least a selected portion of said insulating layer to form an opening by using an etchant to which said etch stop layer is resistant, whereby the depth of said opening is limited by said etch stop layer.

11. An integrated etch stop and phosphor-forming fabrication process as in claim 5, wherein said predefined areas include a plurality of predefined subareas, and said refractory metal etch stop layer depositing step (b) is performed by depositing a plurality of different refractory metals selectively on said subareas.

12. An integrated etch stop and phosphor-forming fabrication process as in claim 5, wherein at least one of said base layer depositing step (a) or said refractory metal etch stop layer depositing step (b) includes depositing a dopant material for doping said second phosphor on each of said predefined areas.

13. An integrated etch stop and phosphor-forming fabrication process as in claim 9, wherein said dopant material is selected from the list consisting of any of the lanthanide series of rare earth elements, manganese, chromium, and combinations thereof.

14. An integrated etch stop and phosphor-forming fabrication process as in claim 10, wherein said etching step is performed before said annealing step.

15. An integrated etch stop and phosphor-forming fabrication process as in claim 10, wherein said etching step is performed after said annealing step.

16. An integrated etch stop and phosphor-forming fabrication process as in claim 12, wherein said predefined areas include a plurality of predefined subareas, and a plurality of dopant materials are deposited selectively on said subareas.

17. An integrated etch stop and phosphor-forming fabrication process comprising the steps of:
   a) providing a substrate;
   b) depositing a base layer of a first phosphor on said substrate;
   c) depositing a refractory metal etch stop layer;
   d) disposing an insulating layer over said etch stop layer;
   e) etching through at least a selected portion of said insulating layer to form an opening by using an etchant to which said etch stop layer is resistant, whereby the depth of said opening is limited by said etch stop layer; and
   f) annealing to combine at least a portion of said base layer with at least a portion of said refractory metal etch stop layer to form a second phosphor.

18. An integrated etch stop and phosphor-forming fabrication process comprising the steps of:
   a) providing a substrate;
   b) depositing a base layer of a first phosphor on said substrate;
   c) depositing a refractory metal layer;
   d) disposing an insulating layer over said refractory metal layer;
   e) annealing to combine at least a portion of said base layer with at least a portion of said refractory metal layer to form both a second phosphor and an etch stop; and
   f) etching through at least a selected portion of said insulating layer to form an opening by using an etchant to which said etch stop is resistant, whereby the depth of said opening is limited by said etch stop.

19. An integrated etch stop and phosphor-forming fabrication process comprising the steps of:
   a) providing a substrate;
   b) depositing a base layer of a metal oxide on said substrate;
   c) depositing a refractory metal etch stop layer on said base layer;
   d) disposing a first insulating layer over said etch stop layer;
   e) disposing a thin layer of a conductive material on said first insulating layer to form an emitter layer;
   f) etching through at least a selected portion of said first insulating layer, said emitter layer, and said second insulating layer to form an opening and to form an emitting edge on said emitter layer by using an etchant to which said etch stop layer is resistant, whereby the depth of said opening is limited by said etch stop layer; and
   g) annealing to combine at least a portion of said base layer with at least a portion of said refractory metal etch stop layer to form a phosphor.

20. An integrated etch stop and phosphor-forming fabrication process comprising the steps of:
   a) providing a substrate;
   b) depositing a base layer of a metal oxide on said substrate;
   c) depositing a refractory metal layer on said base layer;
   d) disposing a first insulating layer over said refractory metal layer;
   e) disposing a thin layer of a conductive material on said first insulating layer to form an emitter layer;
   f) annealing to combine at least a portion of said base layer with at least a portion of said refractory metal layer to form both a phosphor and an etch stop; and
   g) etching through at least a selected portion of said first insulating layer, said emitter layer, and said second insulating layer to form an opening and to form an emitting edge on said emitter layer by using an etchant to which said etch stop is resistant, whereby the depth of said opening is limited by said etch stop.

* * * * *